US009106777B2

(12) United States Patent
Terashima et al.

(10) Patent No.: US 9,106,777 B2
(45) Date of Patent: Aug. 11, 2015

(54) CAMERA CONTROL SYSTEM AND METHOD OF CONTROLLING OPERATION OF SAME

(71) Applicant: FUJIFILM Corporation, Tokyo (JP)

(72) Inventors: Masayuki Terashima, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/164,921

(22) Filed: Jan. 27, 2014

(65) Prior Publication Data

US 2014/0139691 A1 May 22, 2014

Related U.S. Application Data

(63) Continuation of application No. PCT/JP2012/065841, filed on Jun. 21, 2012.

(30) Foreign Application Priority Data

Jul. 28, 2011 (JP) .................................. 2011-164947

(51) Int. Cl.
*H04N 5/232* (2006.01)
*H04N 1/00* (2006.01)
*G02B 7/10* (2006.01)

(52) U.S. Cl.
CPC ............ *H04N 1/00344* (2013.01); *G02B 7/102* (2013.01); *H04N 5/23206* (2013.01); *H04N 5/23248* (2013.01)

(58) Field of Classification Search
CPC ................................................. H04N 5/23209
USPC .................................................. 348/335, 345
See application file for complete search history.

(56) References Cited

U.S. PATENT DOCUMENTS

2002/0030751 A1   3/2002  Takane
2008/0080747 A1*  4/2008  Takagi .......................... 382/118
(Continued)

FOREIGN PATENT DOCUMENTS

EP   1 640 861 A1   3/2006
JP   7-099599 A     4/1995
(Continued)

OTHER PUBLICATIONS

International Search Report issued in PCT/JP2012/065841, mailed on Sep. 18, 2012.
(Continued)

*Primary Examiner* — Anthony J Daniels
(74) *Attorney, Agent, or Firm* — Birch, Stewart, Kolasch & Birch, LLP

(57) ABSTRACT

Collision of communication data on a network line is prevented. A plurality of CPU boards which are independent of one another and have respective ones of CPUs mounted thereon are connected by a network line. Since data collision will occur when multiple streams of control data are transmitted on the network line, the order of priority of camera control is decided. If a zoom lens is shifted toward telephoto and, moreover, the aperture of an iris is shifted toward the open side, the order of priority of focusing lens control is raised. If a zoom lens is shifted toward wide angle and, moreover, the aperture of the iris is shifted toward the closed side, the order of priority of focusing lens control is lowered. Since camera control is carried out in accordance with the order of priority, collision of data on the network line is avoided.

5 Claims, 10 Drawing Sheets

(56) References Cited

U.S. PATENT DOCUMENTS

2011/0068174 A1 3/2011 Miyoshi et al.
2011/0246694 A1* 10/2011 Ichinose ................ 710/200

FOREIGN PATENT DOCUMENTS

| JP | 2002-157111 A | 5/2002 |
| JP | 2003-132007 A | 5/2003 |
| JP | 2005-151475 A | 6/2005 |
| JP | 2006-054918 A | 2/2006 |
| JP | 2010-015131 A | 1/2010 |
| JP | 2010-140290 A | 6/2010 |
| JP | 2011-065607 A | 3/2011 |
| JP | 2011-112700 A | 6/2011 |

OTHER PUBLICATIONS

Extended European Search Report issued in European ApplicationNo. 12817700.3 on Mar. 3, 2015.

* cited by examiner

*Fig. 6*

| PRIORITY | CONTROL PERIOD (ms) |
|---|---|
| 1 | 10 |
| 2 | 20 |
| 3 | 30 |
| 4 | 40 |
| 5 | 50 |

CAMERA CONTROL SYSTEM AND METHOD OF CONTROLLING OPERATION OF SAME

CROSS REFERENCE TO RELATED APPLICATIONS

This application is a Continuation of PCT International Application No. PCT/JP2012/065841 filed on Jun. 21, 2012, which claims priority under 35 U.S.C. §119(a) to Patent Application No. 2011464947 filed in Japan on Jul. 28, 2011, all of which are hereby expressly incorporated by reference into the present application.

TECHNICAL FIELD

This invention relates to a camera control system and to a method of controlling the operation of this system.

BACKGROUND ART

In an interchangeable lens removably mounted on the body of a camera, there is a system in which information concerning the direction of lens movement and size of lens aperture is transmitted upon being changed over on a single signal line in order to avoid an increase in lens contacts (Patent Document 1). Further, there is a system which, in a case where the main body of a camera transmits a control signal so as to cause an interchangeable lens to execute operations one by one, multiple movable members are driven simultaneously because completion of processing would take a long period of time (Patent Document 2). Furthermore, there is a technique in which a real-time property is assured in a microprocessor system by using exclusive control (Patent Document 3). In addition, there is a system that prevents the intrusion of noise due to power inadequacy in a television lens apparatus (Patent Document 4).

[Patent Document 1]: Japanese Patent Application Laid-Open No. 2011-112700
[Patent Document 2]: Japanese Patent Application Laid-Open No. 2010-15131
[Patent Document 3]: Japanese Patent Application Laid-Open No. 2010-140290
[Patent Document 4]: Japanese Patent Application Laid-Open No. 7-99599

Consider implementation of camera control using multiple camera control boards which are independent of one another and which are connected together by network lines. In such case communication data will collide on a network line if the multiple camera control boards communicate using the network line at the same time. In all cameras and the like, however, collision of communication data on a network line is not taken into account because no consideration is given to execution of camera control using multiple camera control boards connected together by a network line.

DISCLOSURE OF THE INVENTION

An object of the present invention is to arrange it so that collision of communication data will not occur on a network line.

A camera control system according to the present invention includes camera control circuits having different control functions mounted on respective ones of a plurality of camera control boards which are independent of one another, the camera control boards being connected together by a network line, characterized in that one camera control board among the plurality of camera control boards decides the order of priority of camera control boards that use the network line, wherein with regard to camera control boards for which the order of priority decided by said one camera control board is the same, preference is given to a predetermined order of priority.

The present invention also provides an operation control method suited to a camera control system. Specifically, the method is a method of operating a camera control system that includes camera control circuits having different control functions mounted on respective ones of a plurality of camera control boards which are independent of one another, the camera control boards being connected together by a network line, wherein one camera control board among the plurality of camera control boards decides the order of priority of camera control boards that use the network line, wherein with regard to camera control boards for which the order of priority decided by said one camera control board is the same, preference is given to a predetermined order of priority.

In accordance with the present invention, a plurality of camera control boards are independent of one another (the boards are separate boards), and camera control circuits having different control functions are mounted on respective ones of the camera control boards. The plurality of camera control boards are connected (bus-connected) together by a network line. Although the plurality of camera control boards can each control the camera independently, the fact that the camera control boards are connected by a network line means that collision of communication data will occur on the network line if control data is transmitted from the plurality of camera control boards at the same time. In accordance with the present invention, one camera control board among the plurality of camera control boards decides the order of priority of camera control boards that use the network line; the network line can be allowed for use in accordance with this order of priority. Collision of control data can be prevented from occurring on the network line.

For example, the one camera control board controls the plurality of camera control boards in such a manner that the higher the order of priority of a camera control board, the greater the number of times the network line is used in a fixed period of time.

Whenever camera control by a camera control board ends, the one camera control board may execute processing for deciding the order of priority of camera control boards that use the network line.

For example, the plurality of camera control boards include a focusing lens control board that controls a focusing lens, a zoom lens control board that controls a zoom lens, and an iris control board that controls an iris. In such case, by way of example, the more the zoom lens is shifted toward telephoto and, moreover, the more the iris is opened, the higher the order of priority given to the focusing lens control board for using the network line; and the more the zoom lens is shifted toward wide angle and, moreover, the more the iris is closed, the lower the order of priority given to the focusing lens control board for using the network line.

For example, the plurality of camera control boards may further include a shake detection control board that detects camera shake, and a shake correction control board that corrects for camera shake. In this case, by way of example, the more the zoom lens is shifted toward telephoto and, moreover, the greater the amplitude of camera shake or the higher the frequency of camera shake, the higher the order of priority given to the shake correction control board for using the network line; and the more the zoom lens is shifted toward wide angle and, moreover, the smaller the amplitude of camera shake or the lower the frequency of camera shake, the lower the order of priority given to the shake correction control board for using the network line.

BRIEF DESCRIPTION OF THE DRAWINGS

FIG. 6 illustrates the relationship between priority and a control period;

BEST MODE FOR CARRYING OUT THE INVENTION

Figure 1:
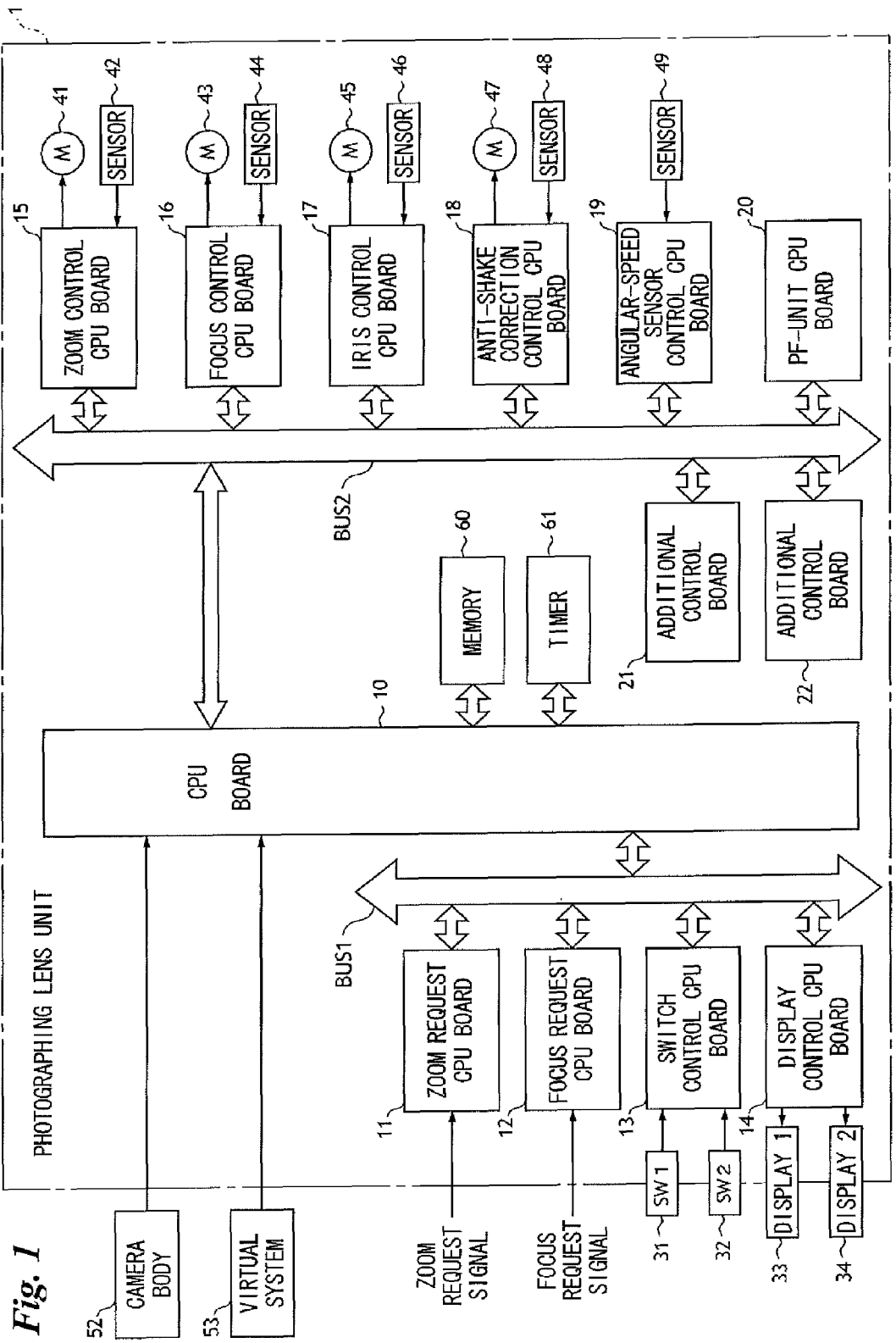
FIG. 1 is a block diagram illustrating the electrical configuration of a photographing lens unit.

FIG. 1 is a block diagram illustrating the electrical configuration of a photographing lens unit (camera control system) 1.

The photographing lens unit 1 includes a number of CPU boards (separate boards) 10 to 22 each of which is independent of the others (and which are mutually removably mounted). CPUs are mounted on respective ones of these CPU boards 10 to 22. With a photographing lens unit 1 according to the prior art, a number of processes are controlled by a single CPU and, as a consequence, a number of processes cannot be executed in parallel. According to this embodiment, however, since CPUs are mounted on respective ones of the boards, a number of processes can be executed at the same time by simultaneously driving the CPUs mounted on the respective boards.

Image data and the like from a camera body 52 and various signals from a virtual system 53 that executes CG (computer graphics) are input to the CPU board 10 by an RS323C cable or the like.

A zoom request signal and a focus request signal applied to the photographing lens unit 1 are applied to zoom request CPU board 11 and focus request CPU board 12, respectively. The photographing lens unit 1 is provided with various switches 31, 32, etc., and signals from these various switches 31, 32, etc., are applied to switch control CPU board 13. The photographing lens unit 1 is further provided with display units 33, 34, etc., and these display units 33, 34, etc., are controlled by the display control CPU board 14.

The zoom request CPU board 11 receives the applied zoom request signal and transmits it to other boards. The focus request CPU board 12 receives the applied focus request signal and transmits it to other boards. The switch control CPU board 13 performs switch control based upon the signals from the various switches 31, 32. The display control CPU board 14 controls the display on the display units (indicators) 33, 34.

A zoom motor 41 that drives a zoom lens (not shown) and a sensor 42 that detects the position of the zoom lens are connected to a zoom control CPU board 15. The zoom motor 41 is driven by the zoom control CPU board 15 so that the zoom lens is controlled to attain a desired position.

A focus motor 43 that drives a focusing lens (not shown) and a sensor 44 that detects the position of the focusing lens are connected to a focus control CPU board 16. The focus motor 43 is driven by the focus control CPU board 16 so that the focusing lens is driven such that the lens will attain a designated position in case of manual focusing and a calculated in-focus position in case of autofocusing.

An iris motor 45 that drives an iris (not shown) and a sensor 46 that detects the f-stop number of the iris are connected to an iris control CPU board 17. The iris motor 45 is driven by the iris control CPU board 17 so that the iris is controlled to attain a desired f-stop number.

An anti-shake lens motor 47 that drives an anti-shake lens (not shown), which corrects for camera shake or the like, and a sensor 48 that detects the position of the anti-shake lens are connected to an anti-shake correction control CPU board 18. The anti-shake lens is driven by the anti-shake correction control CPU board 18 so as to correct for camera shake, which is acquired by control performed by an angular-speed sensor control CPU board 19, described later.

An angular speed sensor 49 is connected to the angular-speed sensor control CPU board 19. Shaking of the camera (photographing lens unit 1) in the vertical and horizontal directions is detected by the angular speed sensor 49. The photographing lens unit 1 is equipped with the camera body 52, and it goes without saying that shaking of the camera body 52 is detected. Data indicating the detected shaking in the horizontal and vertical directions is input from the angular-speed sensor control CPU board 19 to the anti-shake correction control CPU board 18, and the anti-shake lens is driven by the anti-shake correction control CPU board 18. Further, the frequency and amplitude of shaking of the camera body 52 are calculated in the anti-shake correction control CPU board 18.

A PF-unit CPU board 20 generates two graphs representing the relationship between AF evaluation values, which are obtained from a first AF CCD and a second AF CCD (neither of which are shown) that are somewhat shorter and somewhat longer, respectively, than the optical path length of an imaging CCD provided in the camera body 52, and the position of the focusing lens, and calculates the in-focus position, which is the intersection between the two graphs.

Additional control CPU board 21 and 22 are utilized when the photographing lens unit 1 is made to perform additional control.

The photographing lens unit 1 includes a first common bus BUS1 and a second common bus BUS2. The zoom request CPU board 11, focus request CPU board 12, switch control CPU board 13, display control CPU board 14 and CPU board 10 are bus-connected to the first common bus BUS1. The CPU board 10, zoom control CPU board 15, focus control CPU board 16, iris control CPU board 17, anti-shake correction control CPU board 18, angular-speed sensor control CPU board 19, PF-unit CPU board 20 and additional control CPU boards 21 and 22 are bus-connected to the second common bus BUS2. The bus lines (network lines), or the bus lines and boards, are connected together detachably by connectors (not shown). It goes without saying that there need not be two common buses; the number of common buses may be one or three or more.

A memory 60 and a timer 61 are connected to the CPU board 10 by network lines.

Network communication among the above-described boards is capable of utilizing CAN (Controller Area Network) communication.

Figure 2:
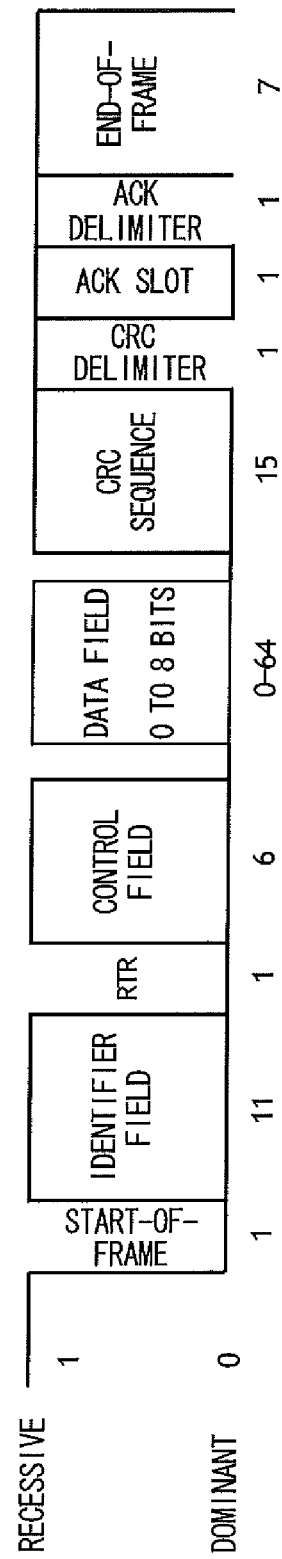
FIG. 2 illustrates the data structure of CAN communication.

FIG. 2 illustrates the structure of a data frame, which is the transfer format used to transmit data in CAN communication.

A data frame is either recessive or dominant. The numerals in each section indicate the numbers of bits. In a case where communication is not being carried out, a bus is recessive (the bus is idle).

A data frame contains a start-of-frame, an identifier field, an RTR, a control field, a data field, a CRC sequence, a CRC delimiter, an ACK slot, an ACK delimiter and an end-of-frame, and transmission is performed in the order mentioned.

The start-of-frame represents the start of the data frame and takes on the dominant state. A receiving-side CPU board (receiving node) is capable of synchronization as a result of the start-of-frame transitioning from bus-idle recessive to dominant.

The identifier field is used in order to identify data content or the transmitting-side CPU board (transmitting node). By detecting the content described in the identifier field, the receiving-side CPU board can determine whether this data frame is the data frame for its own use. The identifier field also decides the order of priority in communication arbitration.

RTR (Remote Transmission Request) is used in order to identify a data frame that transmits data and a remote frame that requests transmission of data. In the case of a data frame, RTR will be dominant. RTR also is used in communication arbitration in a manner similar to that of the identifier field.

The control field indicates how many bytes will be transmitted in the next data frame.

The data field is the data portion transmitted by the data frame.

The CRC (Cyclic Redundancy Check) sequence checks for data corruption at the time of a data transmission.

The CRC delimiter, which is a symbol representing the end of the CRC sequence, is a single bit fixed at the recessive state.

The ACK (Acknowledgement) slot is a field for verifying normal reception.

The ACK delimiter, which is a symbol representing the end of the ACK slot, is a single bit fixed at the recessive state.

The end-of-frame indicates the end of transmission or reception and is fixed at the recessive state.

In a case where data frames happen to be transmitted from multiple CPU boards simultaneously, communication arbitration is carried out. For example, if two data frames have been transmitted, the items of data described in the identifier fields of respective ones of the two data frames are compared bit by bit and priority for transmission is given to the data frame in which the data that indicates a discrepancy first is dominant.

Thus, as set forth above, since the boards 10 to 22 are connected by network lines, control data (data frames) will collide if items of control data that differ simultaneously are transmitted on a network line. In this embodiment, an order of priority is assigned to network-line utilization (control by control boards) and the network line can be utilized in accordance with this order of priority.

Figure 3:
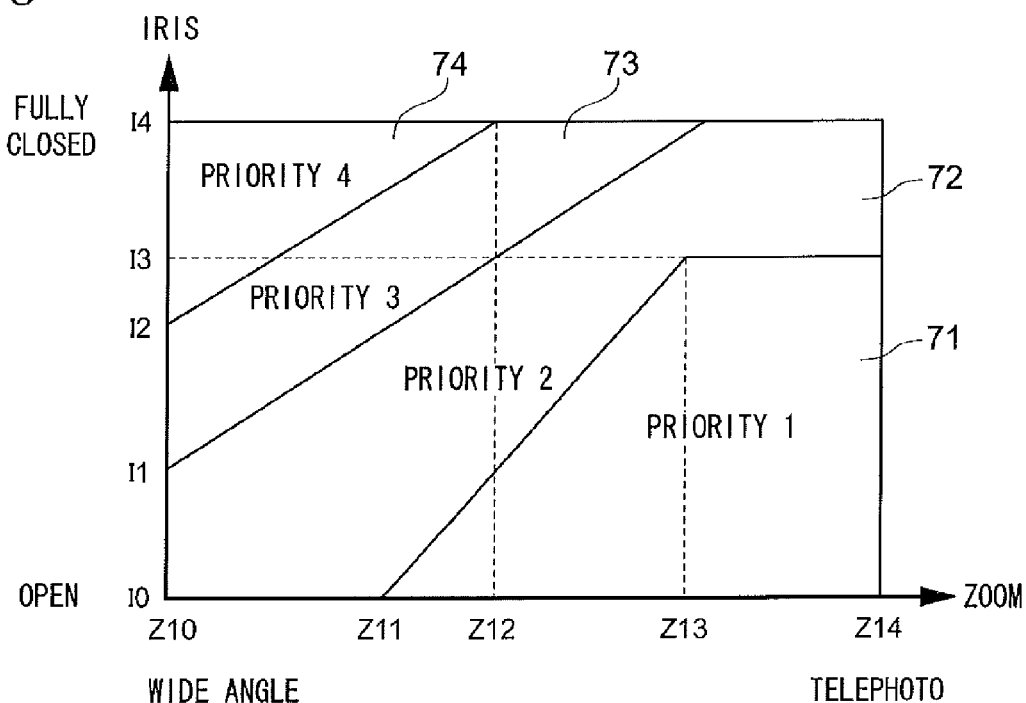
FIG. 3 illustrates the relationship between amount of zoom and f-stop number and focus control priority.
Figure 4:
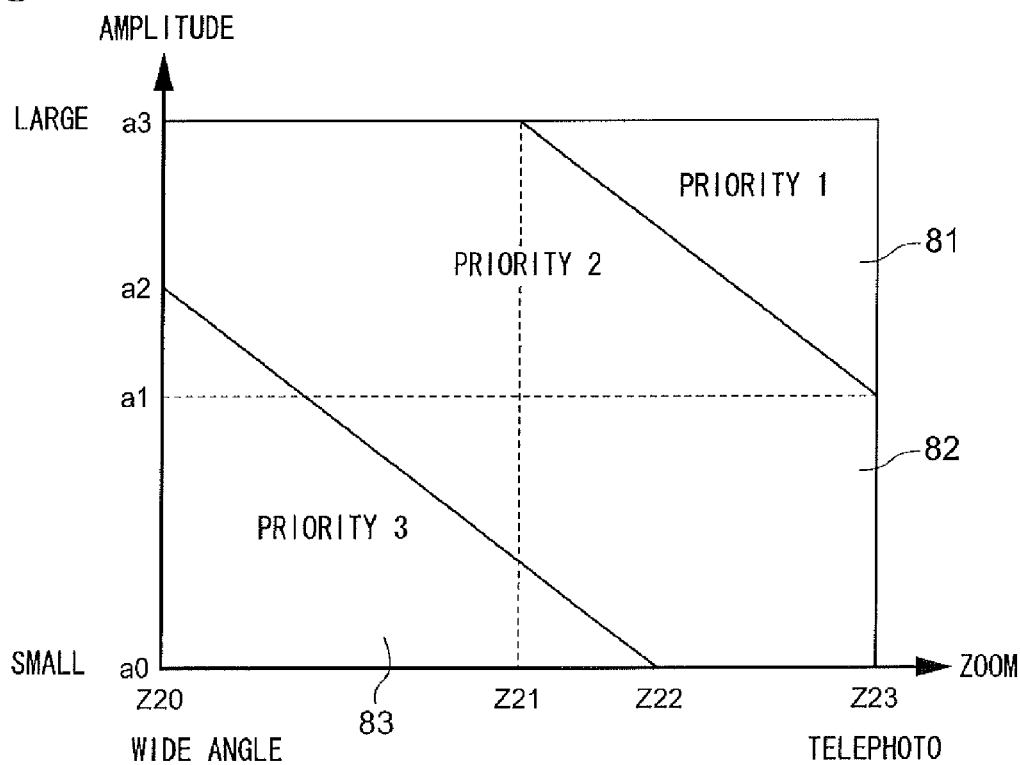
FIG. 4 illustrates the relationship between amount of zoom and camera-shake amplitude and anti-shake lens control priority.
Figure 5:
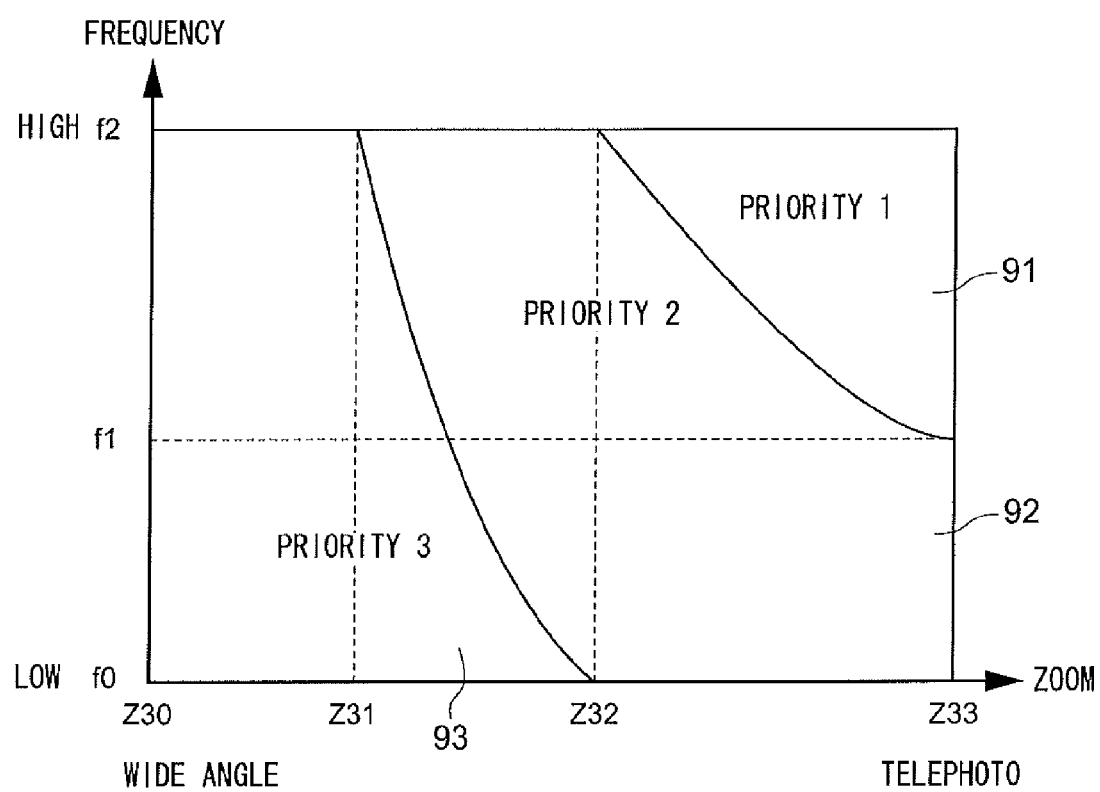
FIG. 5 illustrates the relationship between amount of zoom and camera-shake frequency and anti-shake lens control priority.

FIGS. 3 to 5, which are for assigning priority utilized in deciding order of priority, illustrate relationships between the state of camera control and priority.

FIG. 3 illustrates the relationship between amount of zoom and f-stop number and focus priority.

The horizontal axis indicates the amount of zoom of the zoom lens and the vertical axis indicates the f-stop number of the iris. Regions 71 to 74 have been defined. The region 71 stipulates a region in which the amount of zoom is on the telephoto side and the f-stop number indicates the open-iris side. The region 72 stipulates an area in which, although the amount of zoom is on the telephoto side, the f-stop number indicates that the iris is somewhat more closed than open, and an area in which, although the amount of zoom is on the wide-angle side, the f-stop number indicates the open-iris side. The region 73 stipulates an area in which the amount of zoom is intermediate the telephoto and wide-angle sides and the iris is comparatively closed; an intermediate area in which the amount of zoom is intermediate the telephoto and wide-angle sides and the iris is intermediate the fully open and fully closed states; and an intermediate area in which the amount of zoom is on the comparatively wide-angle side and the iris is intermediate the fully open and fully closed states. The region 74 stipulates a region in which the amount of zoom is on the wide-angle side and the iris is on the closed side.

The more the zoom lens shifts toward the telephoto side and, moreover, the nearer the iris is to the open state (the larger the aperture opening), the shallower the depth of focus. Priority relating to focus is regulated so as to rise at such time. Conversely, the more the zoom lens shifts toward the wide-angle side and, moreover, the more the iris closes, the deeper the depth of focus. Priority relating to focus is regulated so as to decline at such time. Focus priority rises in the order of regions 71, 72, 73, 74. (The priorities of regions 71, 72, 73, 74 are 1, 2, 3, 4, respectively.)

By way of example, assume that a zoom amount Z10 is on the wide-angle end and that the zoom amount shifts towards the telephoto side as it takes on values Z11, Z12, Z13, Z14, and assume that the iris shifts toward the closed state as it takes on values I0, I1, I2, I3, I4, I5. For instance, if the zoom amount is between Z13 and Z14 and the iris has an aperture more open than I3, the focus priority is Priority 1. If the zoom amount is between Z13 and Z14 and the iris has an aperture completely closed (more closed than I3), the focus priority is Priority 2. The area where the zoom amount is between Z12 and Z13 takes on a priority of 1, 2 or 3 depending upon the state of the iris. The area where the zoom amount is between Z11 and Z12 takes on a priority of 1, 2, 3 or 4 depending upon the state of the iris. The area where the zoom amount is between Z10 and Z11 takes on a priority of 2, 3 or 4 depending upon the state of the iris.

Focus priority is decided by the states of the zoom amount and f-stop number.

FIG. 4 illustrates the relationship between amount of zoom and camera-shake amplitude and anti-shake lens control priority.

The horizontal axis indicates the amount of zoom and the vertical axis indicates the camera-shake amplitude. Regions 81, 82 and 83 have been defined. The region 81 indicates a region in which the amount of zoom is on the telephoto side and the amplitude is large. The region 83 indicates a region in which the amount of zoom is on the wide-angle side and the amplitude is small, which is the converse of region 81. The region 82 is a region between the regions 81 and 83.

The more the zoom lens shifts toward the telephoto side and the larger the amplitude, the more conspicuous the blurring of the captured image and, hence, the higher the priority of anti-shake lens control for the purpose of correcting for blurring. Conversely, the more the zoom lens shifts toward the wide-angle side and the smaller the amplitude, the less conspicuous the blurring of the captured image and, hence, the lower the priority of anti-shake lens control for the purpose of correcting for blurring. The priority of anti-shake lens control rises in the order of regions 83, 82, 81.

Let Z20 represent the zoom amount at the wide-angle end, Z23 the zoom amount at the telephoto end, and let Z21, Z22 represent zoom amounts between the wide-angle end and telephoto end (where Z21<Z23 holds and Z23 is the one farther along the telephoto side). Further, let a0 represent the minimum amplitude, a3 the amplitude at or above a predetermined maximum, and let a1, a2 represent amplitudes between these amplitudes (where a1<a2 holds and a2 is the larger amplitude).

The area where the zoom amount is between Z20 and Z21 takes on a priority of 2 or 3 depending upon the amplitude. The area where the zoom amount is between Z21 and Z22 takes on a priority of 1, 2 or 3 depending upon the amplitude. The area where the zoom amount is between Z22 and Z23 takes on a priority of 2 or 3 depending upon the amplitude. The area where the amplitude is between a0 and a1 takes on a priority of 2 or 3 depending upon the zoom amount. The area where the amplitude is between a1 and a2 takes on a priority of 1, 2 or 3 depending upon the zoom amount. The area where the amplitude is between a2 and a3 takes on a priority of 2 or 3 depending upon the zoom amount.

Priority of anti-shake lens control is decided in accordance with the zoom amount and camera-shake amplitude.

FIG. 5 illustrates the relationship between amount of zoom and camera-shake frequency and anti-shake lens control priority.

The horizontal axis indicates the amount of zoom and the vertical axis indicates the camera-shake frequency. Regions 91, 92 and 93 have been defined. The region 91 indicates a region in which the amount of zoom is on the telephoto side and the frequency is high. The region 93 indicates a region in which the amount of zoom is on the wide-angle side. The region 92 is a region between the regions 91 and 93.

The more the zoom lens shifts toward the telephoto side and the higher the frequency, the more conspicuous the blurring of the captured image and, hence, the higher the priority of anti-shake lens control for the purpose of correcting for blurring. Conversely, since blurring is not conspicuous when the zoom amount is on the wide-angle side, the priority of anti-shake lens control for the purpose of correcting for blurring declines. The priority of anti-shake lens control rises in the order of regions 93, 92, 91.

Let Z30 represent the zoom amount at the wide-angle end, Z34 the zoom amount at the telephoto end, and let Z31, Z32, Z33 represent zoom amounts between the wide-angle end and telephoto end (where the zoom amount shifts farther along the telephoto side in the order Z31, Z32, Z33). Further, let f0 represent the minimum frequency, f2 the frequency at or above a predetermined maximum, and let f1 represent a frequency between these.

The area where the zoom amount is between Z30 and Z31 takes on a priority of 3 depending upon the frequency. The area where the zoom amount is between Z31 and Z32 takes on a priority of 2 or 3 depending upon the frequency. The area where the zoom amount is between Z32 and Z33 takes on a priority of 2 depending upon the frequency. The area where the zoom amount is between Z33 and Z34 takes on a priority of 1 or 2 depending upon the frequency. The area where the frequency is between f0 and f1 takes on a priority of 2 or 3 depending upon the zoom amount. The area where the frequency is between f1 and f2 takes on a priority of 1, 2 or 3 depending upon the zoom amount.

Priority of anti-shake lens control is decided in accordance with the zoom amount and camera-shake frequency.

FIG. 6 illustrates the relationship between priority and a control period.

The control period is indicative of the period at which control having the indicated priority is executed. For example, the control periods having the priorities 1, 2, 3, 4, and 5 are 10 ms, 20 ms, 30 ms, 40 ms and 50 ms, respectively. The higher the priority, the greater the number of times control having this priority is executed.

Figure 7:
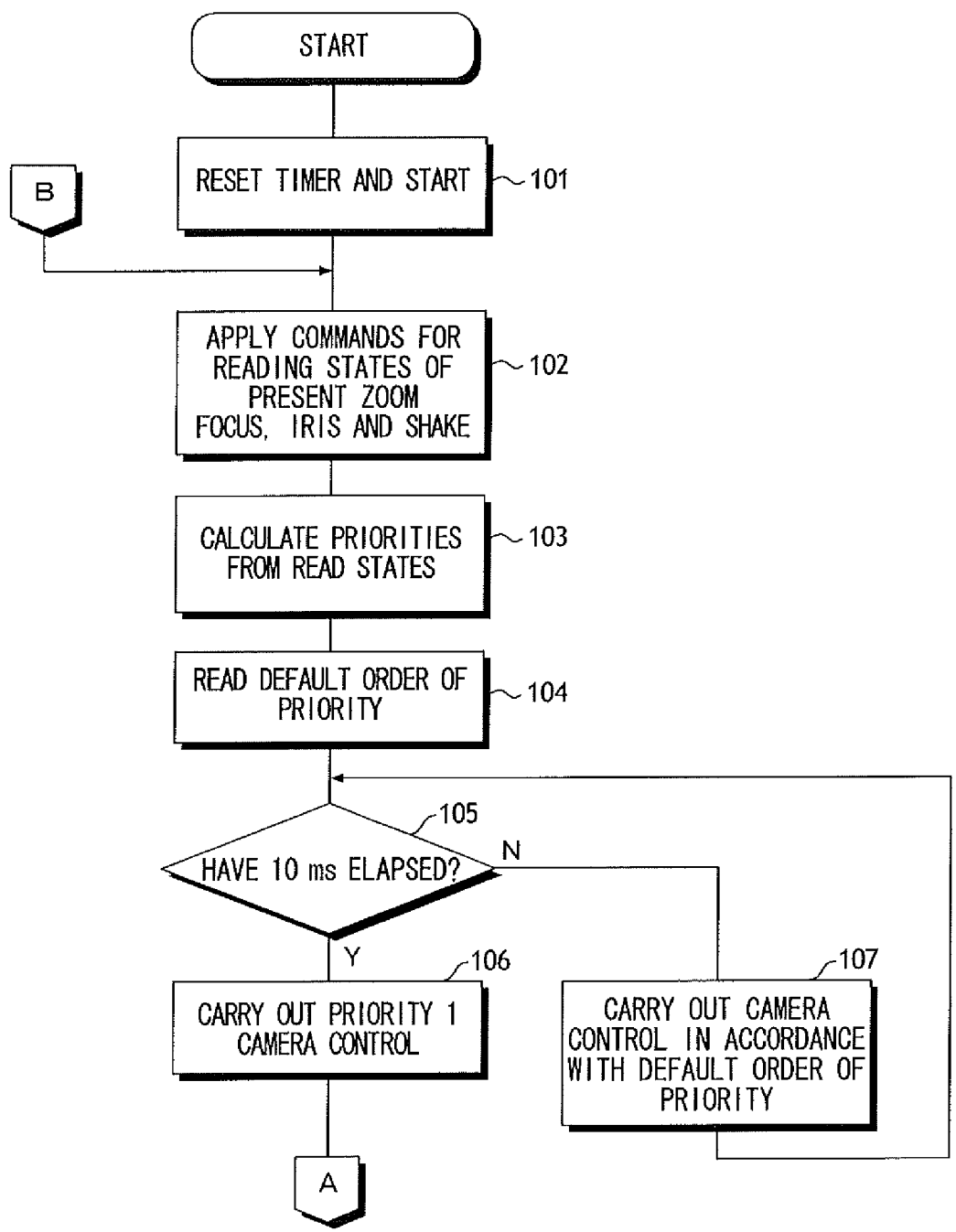
FIG. 7 is a flowchart illustrating the processing procedure of a photographing lens unit.
Figure 8:
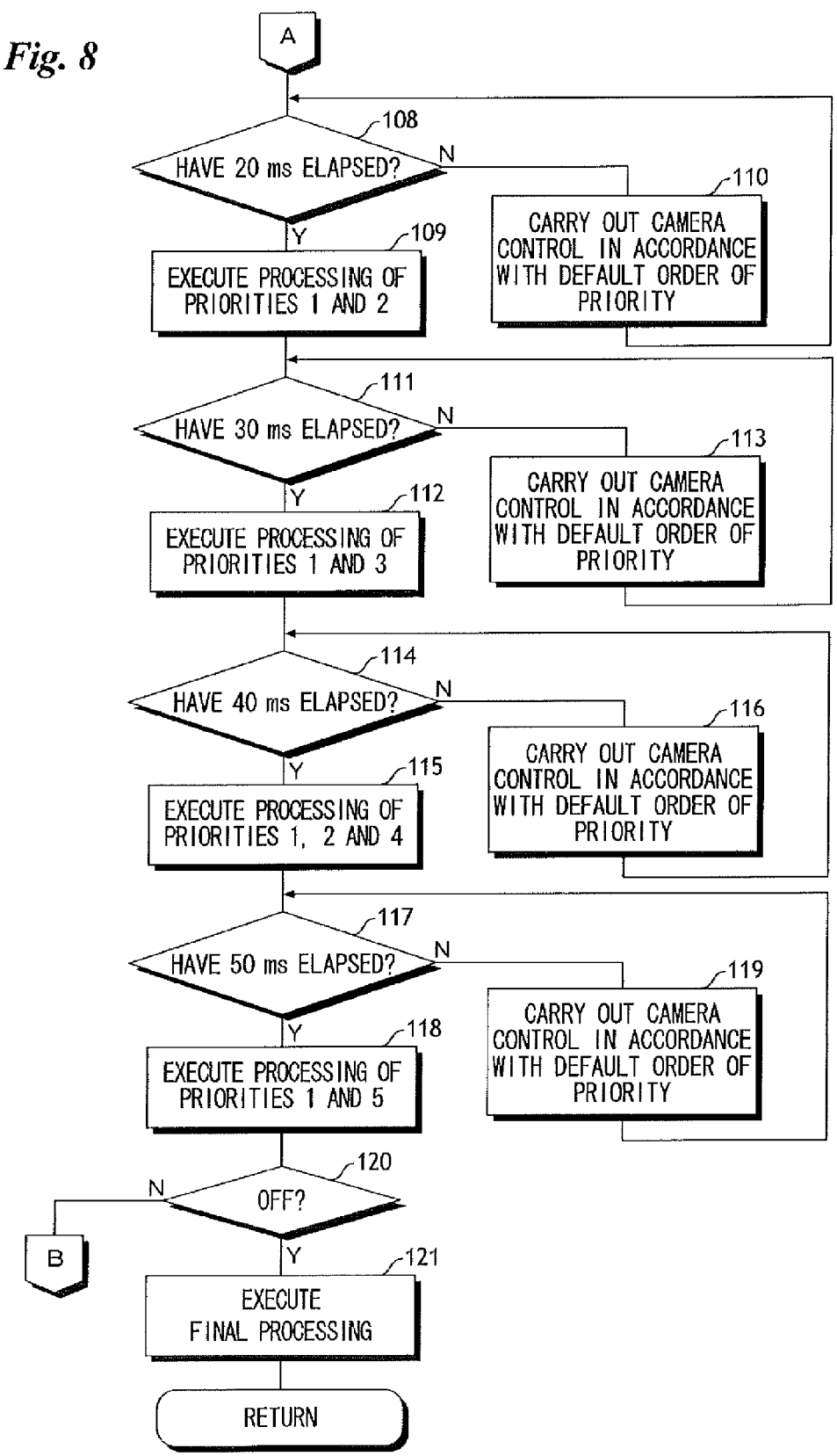
FIG. 8 is a flowchart illustrating the processing procedure of the photographing lens unit.

FIGS. 7 and 8 are flowcharts illustrating the control procedure executed by the photographing lens unit 1.

This processing may be executed constantly or a fixed period while power is being supplied to the photographing lens unit 1.

First, the timer 61 is reset and then started (step 101).

Commands for reading the zoom amount, the position of the focusing lens, the f-stop number and the shaking amplitude and frequency of the camera body 52 are supplied from the CPU board 10 to the zoom control CPU board 15, focus control CPU board 16, iris control CPU board 17 and angular-speed sensor control CPU board 19 (step 102). In response, the zoom amount, the position of the focusing lens, the f-stop number and the shake amplitude and frequency of the camera body 52 are read by the zoom control CPU board 15, focus control CPU board 16, iris control CPU board 17 and angular-speed sensor control CPU board 19. The items of data indicating the states read are applied to the CPU board 10. If the items of data indicating the states read collide on a network line, then these items of data are applied to the CPU board 10 in a predetermined order.

Priority of focusing and priority of anti-shake lens control are calculated in the manner described above from the data indicating the states read (step 103). The priority of anti-shake lens control may be calculated using either amplitude or frequency or both. If priority of anti-shake lens control is calculated using both the shake amplitude and frequency of the camera body 52, then, by way of example, whichever of the priority calculated based upon amplitude and priority calculated based upon frequency is higher is adopted as the priority of anti-shake lens control.

Next, a default order of priority is read from the memory 60 (step 104). The default order of priority indicates an order in which a network line is used by the CPU boards 11 to 22 included in the photographing lens unit 1 (the order in which the CPU boards 11 to 22 exercise control). For example, the order of control has been predetermined in such a manner that control is exercised in the following order: zoom control, focus control, iris control, anti-shake lens control, zoom control, etc. Although the order of control by the other CPU boards also has been decided and not just zoom control, focus control, iris control and anti-shake lens control, the system is regulated such that the number of executions will be small with regard to control having a low order of priority. Further, it may be so arranged that in a case where an externally applied zoom request signal or focus request signal is input to the photographing lens unit 1, control is executed giving this request the highest priority since the request is a manual request from the photographer.

When 10n (where n is a natural number) ms elapse from the start of timer 61 ("YES" at step 105), camera control of priority 1 is carried out (step 106). For example, if focus control has Priority 1, then focus control by the focus control CPU board 16 is carried out and use of the network line by the focus control CPU board 16 takes priority. Priority is assigned by network-line arbitration in CAN communication in the manner described above. If there are multiple camera control operations having Priority 1, then priority is given to whichever has the highest default order of priority. If 10n ms has not elapsed since the start of timer 61 ("NO" at step 105), then camera control is carried out in accordance with the default order of priority read from the memory 60 (step 107).

When 20n ms elapse from the start of timer 61 ("YES" at step 108), camera control of priority 1 and Priority 2 is carried out (step 109). When 20n ms elapse from the start of the timer 61, 10n ms will have elapsed from Priority 1 camera control and therefore not only Priority 2 camera control but also Priority 1 camera control is carried out. Either Priority 1 camera control or Priority 2 camera control may take precedence. For example, the order of priority can be decided in accordance with the default order of priority. If 20 ms have not elapsed from the start of timer 61 ("NO" at step 108), camera control is carried out in accordance with the default order of priority read from the memory 60 (step 110).

When 30n ms elapse from the start of timer 61 ("YES" at step 111), camera control of Priority 1 and Priority 3 is carried out (step 112). If 30n ms have not elapsed from the start of timer 61 ("NO" at step 111), camera control is carried out in accordance with the default order of priority read from the memory 60 (step 113). Similarly, when 40n ms elapse from the start of timer 61 ("YES" at step 114), camera control of Priority 1, Priority 2 and Priority 4 is carried out (step 115). If 40n ms have not elapsed from the start of timer 61 ("NO" at step 114), camera control is carried out in accordance with the default order of priority read from the memory 60 (step 116). Furthermore, when 50n ms elapse from the start of timer 61 ("YES" at step 117), camera control of Priority 1 and Priority 5 is carried out (step 118). If 50n ms have not elapsed from the start of timer 61 ("NO" at step 117), camera control is carried out in accordance with the default order of priority read from the memory 60 (step 119).

If the photographing lens unit 1 is not turned off ("NO" at step 120) as by removal of supply of power to the photographing lens unit 1, then processing is repeated from step 102 onward. When the photographing lens unit 1 is turned off, final processing, such as moving the zoom lens and the like to initial positions, is executed (step 121).

Even if data collision occurs on a network line in the photographing lens unit 1 of the kind in which multiple CPU boards are connected by a network line, an order of priority can be decided and camera control can be carried out in accordance with the order of priority.

Figure 9:
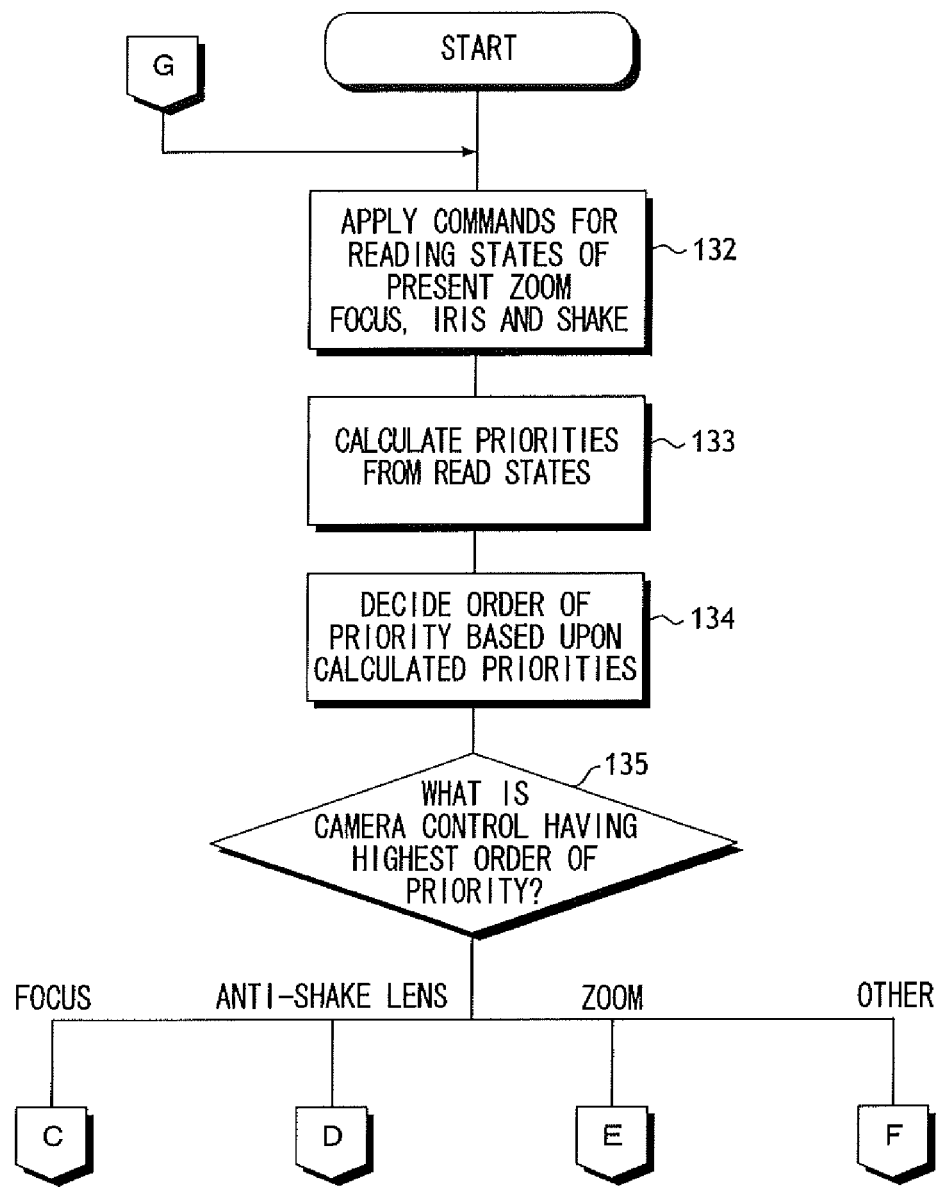
FIG. 9 is a flowchart illustrating the processing procedure of the photographing lens unit.
Figure 10:
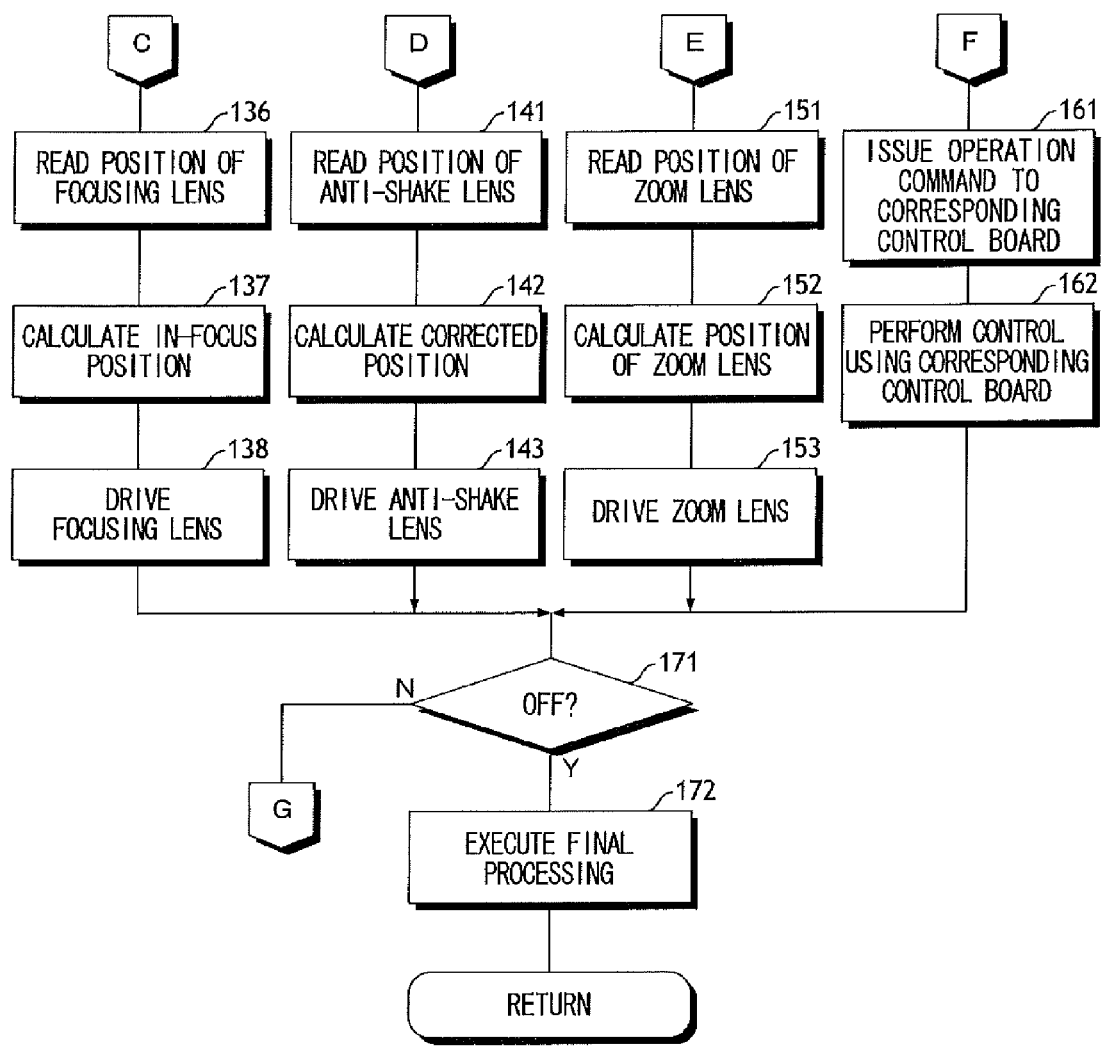
FIG. 10 is a flowchart illustrating the processing procedure of the photographing lens unit.

FIGS. 9 and 10, which illustrate another embodiment, are flowcharts showing the processing procedure executed by the photographing lens unit 1.

As mentioned above, a command for reading the zoom amount, the position of the focusing lens, the f-stop number and the shaking amplitude and frequency of the camera body 52 is supplied from the CPU board 10 to the zoom control CPU board 15, focus control CPU board 16, iris control CPU board 17 and angular-speed sensor control CPU board 19 (step 132). In response, data indicating the zoom amount, the position of the focusing lens, the f-stop number and the shake amplitude and frequency of the camera body 52 is applied to the CPU board 10, as mentioned above.

Priority of focusing and priority of anti-shake lens control are calculated in the manner described above from the data indicating the states read (step 133).

The order of priority of camera control is decided based upon the calculated priorities (step 134). This order of priority also may be decided taking the calculated priorities into account in the default order of priority in the manner described above, or it may be decided separate from the default order of priority. Preferably, it is arranged so that a CPU board having a low order of priority, such as the switch control CPU board 13, is raised to a higher order of priority from time to time. Thus a situation in which a CPU board executes no control at all can be prevented.

When the orders of priority are decided, camera control having the highest order of priority among these decided orders of priority is determined (step 135).

If focus control has the highest order of priority, the CPU board 10 applies an operation command to the focus control CPU board 16. The position of the focusing lens is read by the focus control CPU board 16 (step 136) and the in-focus position is calculated by the PF-unit CPU board 20 (step 137). The focusing lens is driven by the focus control CPU board 16 so as to position the focusing lens at the calculated in-focus position (step 138).

If anti-shake lens control has the highest order of priority, the CPU board 10 applies an operation command to the anti-shake correction control CPU board 18. The position of the anti-shake lens is read by the anti-shake correction control CPU board 18 (step 141). The shake direction and amount of the camera body 52 are detected by the sensor 49 and the corrected position of the anti-shake lens is calculated by the anti-shake correction control CPU board 18 (step 142). The anti-shake lens is positioned by the anti-shake correction control CPU board 18 so as to position the lens at the calculated corrected position (step 143).

If control of the zoom lens has the highest order of priority, the CPU board 10 applies an operation command to the zoom control CPU board 15. The position of the zoom lens (the amount of zoom) is read by the zoom control CPU board 15 (step 151) and the position of the zoom lens is calculated (step 152). For example, the zoom position is calculated based upon the zoom request signal. The zoom lens is driven by the zoom control CPU board 15 so as to attain the calculated zoom position (step 153).

If other camera control has the highest order of priority, then the CPU board 10 applies an operation command to the corresponding control board (step 161). Control is carried out by the corresponding control board (step 162).

If the photographing lens unit 1 is not turned off ("NO" at step 171), processing is repeated from step 132 onward. Processing for deciding order of priority is executed whenever camera control ends. Control having the highest order of priority is carried out again. Since control is not carried out if it does not have the highest order of priority, it is preferred to arrange it so that a history indicating what control has been performed is stored in memory and, if there is a control operation that has not been performed over a fixed period of time, then the highest priority is given to this control.

Figure 11:
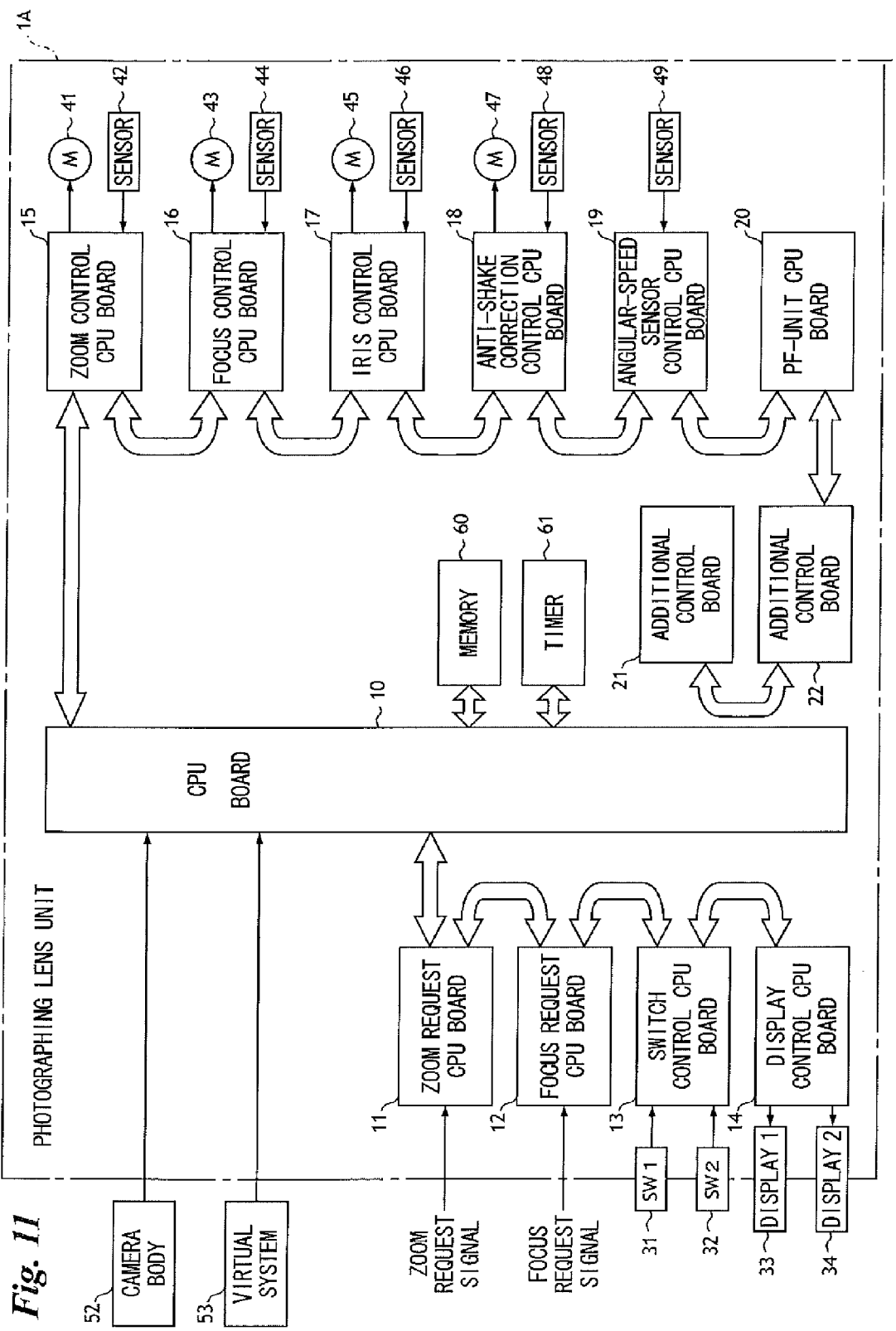
FIG. 11 is a block diagram illustrating the electrical configuration of a photographing lens unit.

FIG. 11 is a block diagram illustrating another electrical configuration of a photographing lens unit 1A according to a modification.

Components in FIG. 11 identical with those shown in FIG. 1 are designated by like reference characters and a description thereof is omitted.

In the modification illustrated in FIG. 11, the zoom request CPU board 11 and focus request CPU board 12, the focus request CPU board 12 and switch control CPU board 13, the switch control CPU board 13 and display control CPU board 14, and the zoom request CPU board 11 and the CPU board 10 are detachably connected (bus-connected) to each other by network lines.

Further, the CPU board 10 and zoom control CPU board 15, the zoom control CPU board 15 and focus control CPU board 16, the focus control CPU board 16 and iris control CPU board 17, the iris control CPU board 17 and anti-shake correction control CPU board 18, the anti-shake correction control CPU board 18 and angular-speed sensor control CPU board 19, the angular-speed sensor control CPU board 19 and PF-unit CPU board 20, the PF-unit CPU board 20 and additional control CPU board 22, and the additional control boards 21 and 22 are detachably connected (bus-connected) to each other by network lines.

The processing described above can be implemented also by the structure shown in FIG. 11.

CAN communication is utilized in the foregoing embodiment but a network technique other than CAN communication may be utilized as well. For example, PROFIBUS, CC-Link, Interbus and EC-NET, etc., can be also be utilized.

Although the CPU boards 10 to 22 are connected by network lines in the above-described embodiment, these CPU boards and network lines are detachably connected by connectors or the like.

Further, the zoom control CPU board 15, focus control CPU board 16, iris control CPU board 17 and anti-shake correction control CPU board 18 are identically constructed and utilization of common boards is contemplated. Further, the zoom request CPU board 11, focus request CPU board 12 and anti-shake correction control CPU board 18 also make use of common boards and all of them have CPUs mounted thereon. The zoom request signal, focus request signal or sensor signal is input via an analog/digital conversion circuit to the CPU mounted on the zoom request CPU board 11, focus request CPU board 12 or angular-speed sensor control CPU board 19. Furthermore, the switch control CPU board 13 and display control CPU board 14 also are identically constructed, signals that are input from the switches 31, 32 and the like are input to the CPU of the switch control CPU board 13 via an analog/digital conversion circuit, and control data from the CPU of the display control CPU board 14 is converted to an analog control signal in a digital/analog conversion circuit and the analog control signal is input to the display units 33, 34. Furthermore, the PF-unit CPU board 20 and additional control CPU boards 21 and 22 also may of the same construction.

Since the CPUs and communication circuits (transceivers), which are for communicating via the network lines, are mounted on the CPU control boards 10 to 22 as common parts, utilization of common parts in regard to these circuits can be achieved as well.

The invention claimed is:

1. A camera control system in which camera control circuits having different control functions are mounted on respective ones of a plurality of camera control boards which are independent of one another, the camera control boards being connected together by a network line, wherein one camera control board among said plurality of camera control boards decides the order of priority of camera control boards that use the network line;

wherein with regard to camera control boards for which the order of priority decided by said one camera control board is the same, preference is given to a predetermined order of priority, and wherein said plurality of camera control boards include a focusing lens control board that controls a focusing lens, a zoom lens control board that controls a zoom lens, and an iris control board that controls an iris, and the more the zoom lens is shifted toward telephoto and, moreover, the more the iris is opened, the higher the order of priority given to said focusing lens control board for using the network line, and the more the zoom lens is shifted toward wide angle and, moreover, the more the iris is closed, the lower the order of priority given to said focusing lens control board for using the network line.

2. A camera control system according to claim 1, wherein said one camera control board controls said plurality of camera control boards in such a manner that the higher the order of priority of a camera control board, the greater the number of times the network line is used in a fixed period of time.

3. A camera control system according to claim 1, wherein whenever camera control by a camera control board ends, said one camera control board executes processing for deciding the order of priority of camera control boards that use the network line.

4. A camera control system according to claim 1, wherein said plurality of camera control boards further include:
   a shake detection control board that detects camera shake; and
   a shake correction control board that corrects for camera shake; and
   the more the zoom lens is shifted toward telephoto and, moreover, the greater the amplitude of camera shake or the higher the frequency of camera shake, the higher the order of priority given to the shake correction control board for using the network line, and the more the zoom lens is shifted toward wide angle and, moreover, the smaller the amplitude of camera shake or the lower the frequency of camera shake, the lower the order of priority given to the shake correction control board for using the network line.

5. A method of controlling operation of a camera control system in which camera control circuits having different control functions are mounted on respective ones of a plurality of camera control boards which are independent of one another, the camera control boards being connected together by a network line, wherein one camera control board among said plurality of camera control boards decides the order of priority of camera control boards that use the network line;

wherein with regard to camera control boards for which the order of priority decided by said one camera control board is the same, preference is given to a predetermined order of priority, and wherein said plurality of camera control boards include a focusing lens control board that controls a focusing lens, a zoom lens control board that controls a zoom lens, and an iris control board that controls an iris; and the more the zoom lens is shifted toward telephoto and, moreover, the more the iris is opened, the higher the order of priority given to said focusing lens control board for using the network line, and the more the zoom lens is shifted toward wide angle and, moreover, the more the iris is closed, the lower the order of priority given to said focusing lens control board for using the network line.

* * * * *